J. A. DANN.
HORSESHOE ATTACHMENT.
APPLICATION FILED JAN. 16, 1911.
988,980.
Patented Apr. 11, 1911.
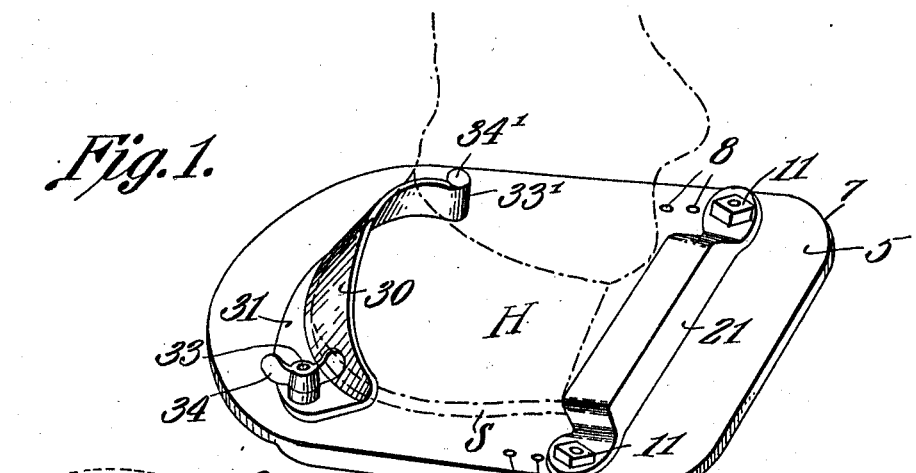
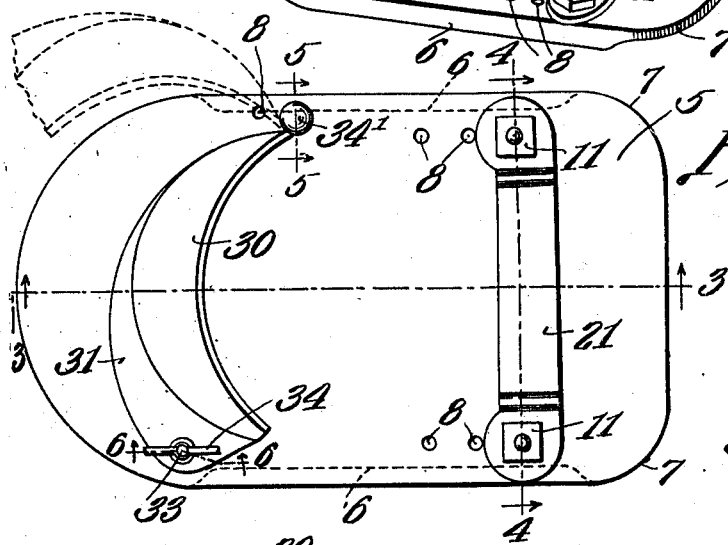
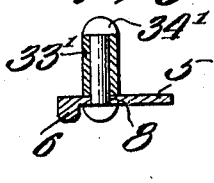
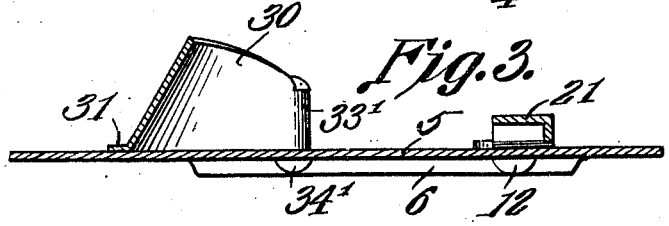
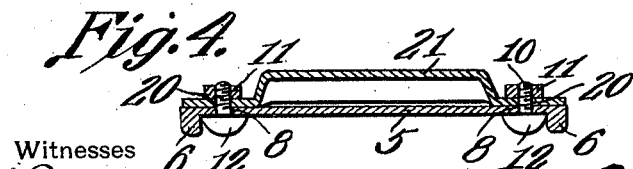
J. A. Dann, Inventor

UNITED STATES PATENT OFFICE.

JOSEPH A. DANN, OF MIAMI, FLORIDA.

HORSESHOE ATTACHMENT.

988,980. Specification of Letters Patent. Patented Apr. 11, 1911.

Application filed January 16, 1911. Serial No. 602,936.

*To all whom it may concern:*

Be it known that I, JOSEPH A. DANN, a citizen of the United States, residing at Miami, in the county of Dade and State of Florida, have invented a new and useful Horseshoe Attachment, of which the following is a specification.

This invention relates to farriery, and more especially to over-shoes such as are to be applied to horse shoes when the animal is to use them upon soft or marshy ground; and the object of the same is to produce a muck shoe sole for rigid but detachable connection with a horse shoe of any size.

I have found by experiment that in order to produce a close fit to the horse's hoof without injuriously affecting it in any manner, it is necessary to adjust both the heel member and the toe member, especially with horses that are addicted to the habit of stumbling. In fact, this bad habit is ordinarily greatly increased by the addition of an over-shoe to the horse's hoof, because the size of the sole of such shoe is of course increased; and it will be seen that by permitting adjustments of both the front and rear clamps, the sole plate can be set further forward or further back as the exigencies of the case may require.

My invention is more particularly described and claimed below, and shown in the drawings wherein—

Figure 1 is a perspective view of this device complete, the horse's hoof being shown in dotted lines. Fig. 2 is a plan view thereof. Fig. 3 is a section on the line 3—3. Fig. 4 is a section on the line 4—4. Fig. 5 is a section on the line 5—5, and Fig. 6 is a section on the line 6—6, all of said lines being shown in Fig. 2.

The device comprises a flat plate or sole 5, which may or may not have ribs 6 along its bottom as desired, and whose corners are preferably rounded as at 7, those in front considerably so. Near its side edges at the rear, this plate is pierced with a number of holes or slots 8, preferably arranged in two series or more, and near the front with other holes or slots, also preferably arranged in two or more series. Through a pair of the rearmost holes or slots extend detachable fastening members which are preferably bolts 10 having their nuts 11 on top and their heads 12 beneath, said heads taking the place of the ribs 6 in case the latter are not employed. These bolts and nuts extend through eyes 20 at the extremities of an angle iron 21, which stands across near the rear end of the plate, and is intended to pass over the heels of the horse shoe and it may be curved down between the shoe heels to clear the frog of the foot. It will be obvious that by removing the nuts and bolts, the angle iron can be set at a point further forward or further to the rear as may be needed.

The forward clamp comprises a shield 30, whose body is curved and inclined to the rear as shown, and which has at its lower edge a flat flange or lug or angle 31; it may grow wider toward one end and be pierced with a hole 32. Through one of the holes 9 and through this hole 32 passes a bolt 33, preferably having a winged nut 34 on its upper end to permit of its more ready adjustment. The other end of the shield is formed into an upright sleeve or lug or extension 33′, through which passes a pivotal fastening member, shown in Fig. 5, preferably as a rivet 34′, although it will be clear that a bolt might be substituted, and in fact a bolt would be preferable where this end of the shield is to be adjusted. Ordinarily this end will not be adjusted, although the other end will be. Thus it will be seen that I have produced devices by means of which both the forward and rearward clamps may be adjusted, and after adjustment may be held securely in place. The uses of an over-shoe of this type are too well known to need repetition here. If properly applied, it is impossible to clamp or bruise the coffin bone, laminated leaves or velvety tissue of the foot.

What is claimed as new is:

A horse shoe attachment for soft ground, the same comprising a plate having near its side edges two series of opposite holes or slots at the rear and additional holes or slots at the front, a rear clamp of angle iron with eyes at its ends, bolts through said eyes and a pair of the rearmost holes with their heads beneath the plate; a forward clamping shield comprising an inclined body with a flat flange at one end pierced with a hole and an upright sleeve at the other end, a rivet extending through said sleeve and one of the foremost holes in the plate and pivotally attaching that end of the guard to the plate, a bolt extending through one of the foremost holes at the opposite side of the plate and through the hole in said flange, and a wing nut on the upper end of this bolt, all substantially as described.

In testimony that I claim the foregoing as my own, I have hereto affixed my signature in the presence of two witnesses.

JOSEPH A. DANN.

Witnesses:
  J. B. HAWKINS,
  I. M. HULL.

Copies of this patent may be obtained for five cents each, by addressing the "Commissioner of Patents, Washington, D. C."